(12) United States Patent
Park et al.

(10) Patent No.: US 6,907,464 B1
(45) Date of Patent: *Jun. 14, 2005

(54) METHOD FOR TEMPORARY DELETION AND RESTORATION OF STREAM OBJECT AND FAST PERMANENT DELETION OF TEMPORARILY DELETED STREAM OBJECT, AND RECORDING MEDIUM FOR STORING ADDITIONAL INFORMATION FOR RESTORATION OR PERMANENT DELETION OF TEMPORARILY DELETED STREAM OBJECT

(75) Inventors: Sung-wook Park, Seoul (KR); Seong-jin Moon, Seoul (KR); Young-nam Oh, Seongnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/571,387

(22) Filed: May 15, 2000

(30) Foreign Application Priority Data

May 15, 1999  (KR) ......................................... 1999-17504

(51) Int. Cl.[7] .......................... G06F 15/16; G06F 12/00; G11B 27/00; H04N 5/91
(52) U.S. Cl. ............................ 709/231; 386/4; 386/95; 707/200
(58) Field of Search ............................... 386/95, 4, 68; 709/231; 707/200; 368/68, 95, 125, 126; 705/51; 715/500.1

(56) References Cited

U.S. PATENT DOCUMENTS 5,852,664 A * 12/1998 Iverson et al. ................. 705/51
5,861,880 A * 1/1999 Shimizu et al. ............. 715/500.1
5,966,495 A * 10/1999 Takahashi et al. ............. 386/68
6,181,870 B1 * 1/2001 Okada et al. .................. 386/95
6,453,116 B1 * 9/2002 Ando et al. .................... 386/68
6,519,612 B1 * 2/2003 Howard et al. ............. 707/200
6,763,179 B1 * 7/2004 Park et al. ..................... 386/95

FOREIGN PATENT DOCUMENTS

| JP | 11-317056 | 11/1999 |
| JP | 2000-30414 | 1/2000 |
| JP | 2000-358215 | 12/2000 |
| JP | 2002-544642 | 12/2002 |
| WO | 00/46803 | 8/2000 |

* cited by examiner

Primary Examiner—William A. Cuchlinski, Jr.
Assistant Examiner—Michael Delgado
(74) Attorney, Agent, or Firm—Stein, McEwen & Bui, LLP

(57) ABSTRACT

A method for temporarily deleting a stream object, a method for restoring stream objects divided by temporary deletion to the original stream object, and an information structure for the methods, and a recording medium storing information for fast permanent deletion of temporarily deleted parts is disclosed. The methods can solved the problem that full restoration cannot be guaranteed in managing and editing (temporarily deleting) a content, which includes a film, music, or other data, using a plurality of units, and fast response is enabled even when a temporarily deleted part is permanently deleted. Also, a method for generating search information when dividing stream objects through temporary deletion/permanent deletion, which has not been disclosed. Using the information structure and restoration method, stream objects divided by temporary deletion are fully restored to their original state before temporary deletion, and temporarily deleted parts can be permanently deleted quickly.

29 Claims, 11 Drawing Sheets

FIG. 7

| | SOB RELATED INFORMATION | SC_TY | EP_S_SOBU | EP_E_SOBU | SC_S_APAT | SC_E_APAT |
|---|---|---|---|---|---|---|
| BEFORE PARTIAL DELETION | Cell_org | TE off, PE off | | | 0.8 | 4.8 |
| AFTER PARTIAL DELETION | Cell1 | NO CHANGE | TE off, PE off | | | 0.8 | 1.5 |
| | Cell2 | NO CHANGE | TE on, PE on | 2 | 2 | ARRIVAL TIME OF FIRST AP AFTER x | ARRIVAL TIME OF LAST AP BEFORE y |
| | Cell3 | NO CHANGE | TE off, PE off | | | 3.8 | 4.8 |

FIG. 12

| | | SOB RELATED INFORMATION | SC_TY | EP_S_SOBU | EP_E_SOBU | SC_S_APAT | SC_E_APAT |
|---|---|---|---|---|---|---|---|
| BEFORE PARTIAL DELETION | Cell_org | | TE off, PE off | | | 0.8 | 4.8 |
| AFTER PARTIAL DELETION | Cell1 | NO CHANGE | TE off, PE off | | | 0.8 | 1.5 |
| | Cell2 | NO CHANGE | TE on, PE on | 2 | 2 | ARRIVAL TIME OF FIRST AP AFTER x | ARRIVAL TIME OF LAST AP BEFORE y |
| | Cell3 | NO CHANGE | TE off, PE off | | | 3.8 | 4.8 |
| AFTER FULL RESTORATION | Cell_rec | NO CHANGE | TE off, PE off | | | 0.8 | 4.8 |

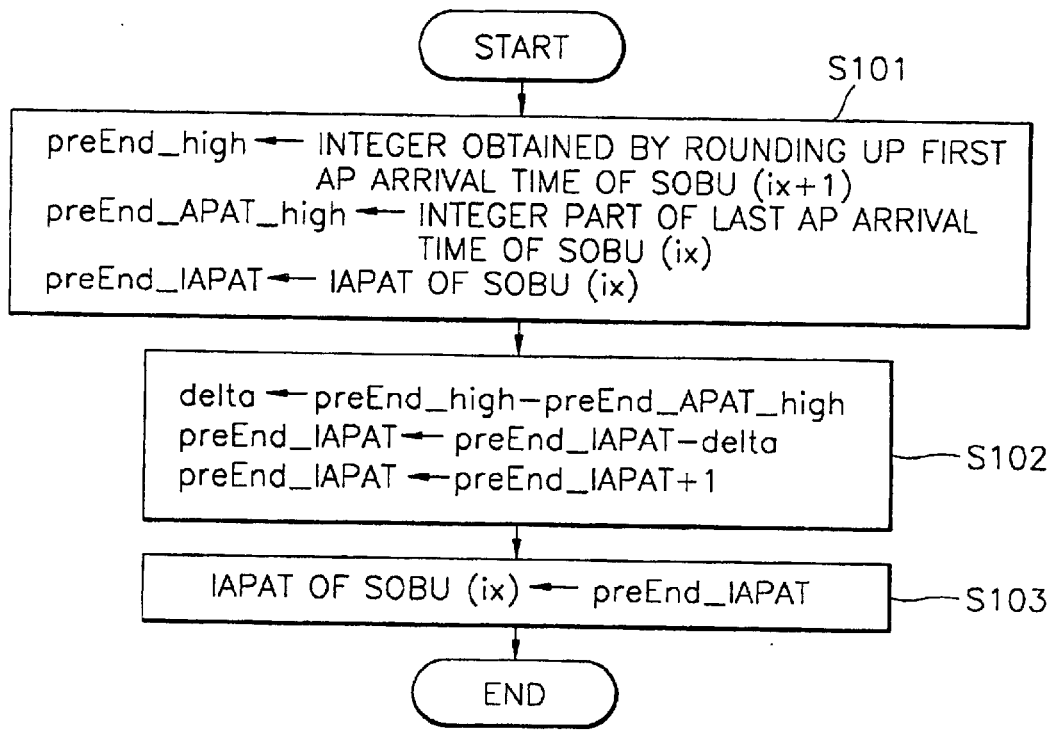
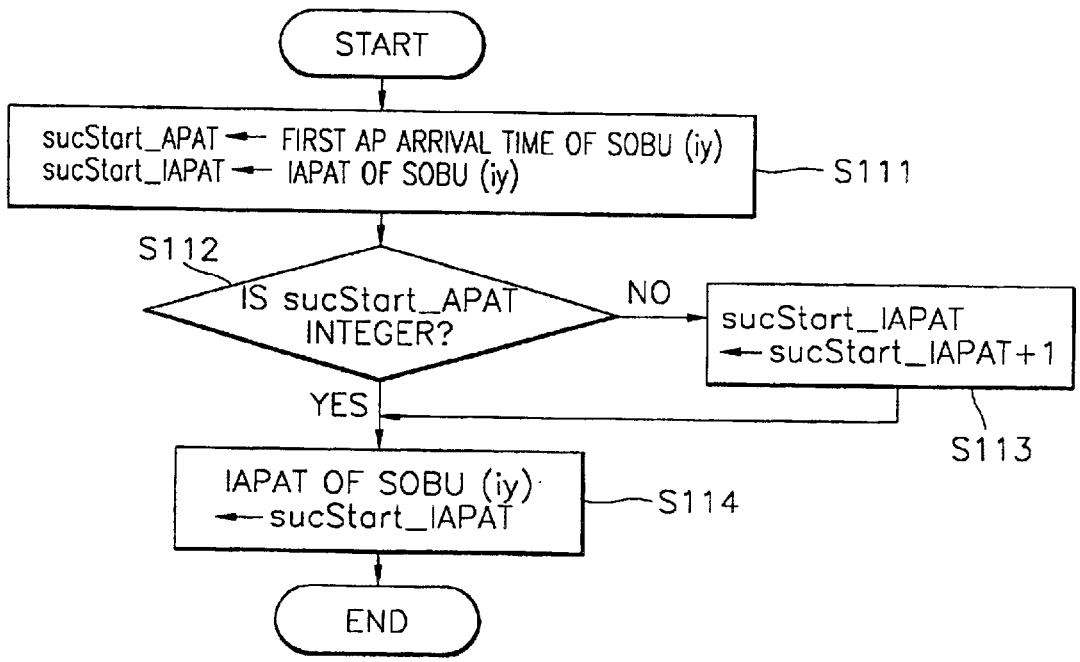

METHOD FOR TEMPORARY DELETION AND RESTORATION OF STREAM OBJECT AND FAST PERMANENT DELETION OF TEMPORARILY DELETED STREAM OBJECT, AND RECORDING MEDIUM FOR STORING ADDITIONAL INFORMATION FOR RESTORATION OR PERMANENT DELETION OF TEMPORARILY DELETED STREAM OBJECT

CROSS-REFERENCE TO RELATED APPLICATIONS

This application claims the benefit of Korean Application No. 99-17504, filed May 15, 1999, in the Korean Industrial Property Office, the disclosure of which is incorporated herein by reference.

BACKGROUND OF THE INVENTION

1. Field of the Invention

The present invention relates to editing and/or reproducing of packet-structured data, and more particularly, to a method for temporary deletion and restoration of a stream object, and fast permanent deletion of temporarily deleted stream object, and a recording medium for storing additional information for restoration or permanent deletion of temporarily deleted stream object.

2. Description of the Related Art

In general, content is formed by a stream object (SOB), and an SOB is managed in SOB units (SOBUs). Here, the stream object can be, for example, data which are recorded while a user records something from the beginning to the end. More particularly, an episode of a miniseries or a film can be recorded in one or more stream objects. Since a program can be used for explanation instead of a content, the word "program" will be used hereinafter.

FIG. 1 illustrates an example of the relationship between data and search information, which is used in reading desired data in an already recorded stream object. When a user records a program, a continuous program is seen by the user. Internally, however, a cell which provides a meaningful search tool to the user, and stream object information (SOBI), which links information in a cell to actual data, also exist.

Particularly as for a stream object, in order to improve the physical properties of recording media and the performance and/or convenience of management and efficiency of reproducing/editing devices, data are grouped in predetermined units (SOBUs) for management in an SOB, and information used in accessing the SOBUs is stored in a mapping list (MAPL) of the SOBI. The SOBUs are referenced starting from the number "1" and the MAPL can have a plurality of items. These items have information of incremental application packet arrival time (IAPAT), which corresponds to the difference between the arrival time of the first packet of a stream object unit and the first packet of the next consecutive stream object unit.

In order to randomly access a program recorded in a storage device, generally, search information on a program to be accessed is separately prepared and used. Search information generally includes information on data location in a program, program reproducing time, and program recording time. When a recorded program is a film, characteristic scenes can be used as search information. Here, a program recording time will be used as an example of search information.

Search information can have diverse formats in accordance with application fields, and generally data are grouped into a contiguous block as a unit of searching object in order to reduce the volume of search information and enable fast searching. Such grouping into a block is usually done in a layered structure. FIG. 1 illustrates an example of a three-layered structure.

When search information is made in the form of a layered structure, information in an upper layer includes information on a normal immediately-lower layer. A cell is an upper layer in search information which is included in a program. A stream object is located below the cell and stream object units are located below the stream object. Each layer of search information can have diverse relationships and, here, the following is assumed.

A program is formed of one or more cells, a cell is formed of one SOB, an SOB is formed of one or more SOBUs, and an SOBU is formed of one or more data.

FIG. 1 shows a case where Program_org is formed of Cell_org; Cell_org is formed of an SOB; the SOB is formed of SOBU(1), SOBU(2), and SOBU(3), and each SOBU is formed of data. That is, Program-org has an information structure storing information on its associated cell, the cell has an information structure storing information on its associated SOB, and each SOB has an MAPL which is an information structure that stores information on its associated SOBUs.

In addition, in order to show the range of stream objects that the search information manages, the arrival time of the first data of a cell (SC_S_APAT) and the arrival time of the last data of a cell (SC_E_APAT) are included in cell information, and the first data arrival time of a stream object (SOB_S_APAT) and the last data arrival time of a stream object (SOB_E_APAT) are included in the SOBI. A temporary erase (TE) flag represents that a stream object is temporarily deleted. Here, temporary deletion means that, after a user deletes all or some parts of a program, a chance to cancel the deletion is given to the user. In contrast, permanent deletion means a deletion for which a user is not given a chance to cancel the deletion.

Each item of the MAPL is represented by incremental AP arrival time (IAPAT) information which means the contiguous time of each corresponding SOBU. Here, AP is an abbreviated form of application packet, and means packet-structured data. IAPAT, the contiguous time of an SOBU, is defined as follows.

The degree of precision of search information expressed in time units depends on the application. For moving picture experts group-2 (MPEG-2) system, time is counted and used in units of 27 MHz. In FIG. 1, data is expressed in units of 0.1. In order to reduce the length of the search information MAPL, an SOB is assumed to express time in units of 1.0. When this is applied to a 48-bit register for expressing time, a portion equal to or greater than point b18, shown in FIG. 2, represents the integer part and a portion less than point b18 represents a decimal fraction. The location of b18, immediately upper this decimal fraction, will be expressed as MTU_SHFT.

In addition, the IAPAT of the MAPL shown in FIG. 1 have values of 3, 1, and 1. These values are based upon the arrival times of the first and last AP for SOBU(2), and SOBU(3). While not shown explicitly, for FIG. 1, the arrival time for the first AP for SOBU(2) is 2.1, the arrival time for the first AP for SOBU(3) is 3.5, and the arrival time for the last AP for SOBU(3) is 4.8. Using these values, the method used for determining the IAPAT information of an SOBU, depends on the location of an SOBU in an SOB, that is, whether or not an SOBU is the last SOBU in an SOB.

For example, when an SOB is formed of M SOBU's, the accumulated value of IAPATs from the first to the i-th SOBU except the last SOBU must not be greater than the first AP arrival time of SOBU(i+1) by 1. At this time, IAPAT is assumed to be an integer expressed in units of 1.0, and the initial value of accumulation is assumed to be "0." This is expressed in the following equation 1.

$$SOBU\_S\_APAT(i+1) \leq SUM\_IAPAT(i) < SOBU\_S\_APAT(i+1)+1. \quad (1)$$

Here, SUM_IAPAT(i) represents the accumulated value of all the preceding SOBUs' IAPAT values, including the corresponding SOBU, that is, SOBU#i, and SOBU_S_APAT(i+1) represents the arrival time of the first AP of SOBU(i+1).

When M SOBUs exist, the accumulated value of IAPATs from the first to the M-th for SOBU(M), the last SOBU, must be greater than the arrival time of the last AP of SOBU(M) and must not be greater than the arrival time of the last AP of SOBU(M) by 1. At this time, IAPAT is assumed to be an integer expressed in units of 1.0, and the initial value of accumulation starts from "0."

$$SOBU\_E\_APAT(M) < SUM\_IAPAT(M) \leq SOBU\_E\_APAT(M)+1. \quad (2)$$

Here, SUM_IAPAT(M) represents the accumulated value of all preceding IAPATs, including the IAPAT of a corresponding SOBU, SOBU (M), and SOBU_E_APAT(M) represents the arrival time of the last AP of SOBU(M).

Using equations (1) and (2), the IAPATs for SOBU(1), SOBU(2), and SOBU(3) shown in FIG. 1 is 3, 1, 1 as shown.

Referring to FIG. 3, the concepts of the equations 1 and 2 will now be explained in detail. For example, IAPAT(1), IAPAT(2) and IAPAT(6) can be obtained as follows.

In FIG. 3, for SOBU(1), the IAPAT of SOBU(1) must be equal to or greater than the arrival time of the first AP of SOBU(2), and must not be greater than the arrival time of the first AP of SOBU(2) by 1. That is, the result of accumulation must be equal to or greater than 1.9, and must be an integer less than 2.9, and therefore, the result must be 2. Accordingly, the IAPAT of SOBU(1) is 2.

As for SOBU(2), the sum of the IAPATs of SOBU(1) and SOBU(2) must be greater than or equal to the arrival time of the first AP of SOBU(3), and must not be greater than that by 1. That is, the result of accumulation must be equal to or greater than 5.5, and must be an integer less than 6.5, and therefore, the result must be 6. Since the IAPAT of SOBU(1) is 2, the IAPAT of SOBU(2) is 4.

In this way, IAPATs of the first SOBU and a middle SOBU can be obtained. However, FIG. 4A shows a boundary condition that needs to be more carefully handled. When the IAPAT of SOBU(2) of FIG. 4A is calculated and the arrival time of the first AP of SOBU(3) is integer value of 5.0, the result of accumulation to the IAPAT of SOBU(2) is not 6, but 5. As such, care must be taken if the first AP of a middle SOBU is an integer value.

As for the last SOBU, SOBU(6) in FIG. 3, the sum of all the IAPATs preceding and including the IAPAT of SOBU(6) must not be greater than or equal to the arrival time of the last AP of SOBU(6) than by 1. That is, the result of accumulation must be greater than 10.8, and must be an integer less than or equal to 11.8, and therefore, it must be 11. Since the result of accumulation of IAPAT to SOBU(5) is 10, the IAPAT of SOBU(6) is 1.

In this way, the IAPAT of the last SOBU in an SOB can be obtained. However, FIG. 4B shows a boundary condition that needs to be more carefully handled. When the IAPAT of SOBU(6) of FIG. 4B is calculated when the arrival time of the last AP of SOBU(6) is the integer value of 11.0, the result of accumulation to the IAPAT of SOBU(6) is not 11, but 12. As such, care must be taken if the last AP of a last SOBU is an integer.

When a program is temporarily deleted, this deletion is indicated by a temporary erase (TE) flag, which generally known. Using a TE Flag, when a part of a program is temporarily deleted, a stream object is divided into a temporarily deleted stream object and undeleted stream objects, and the TE flag is set in the temporarily deleted stream object. This division is for restoring the deleted part later by changing only the search information which links a user and data, without actually deleting data.

While a method for dividing search information is known, a method for generating search information in dividing a stream object has not been disclosed. Also, only the TE flag indicates that the temporarily deleted part has been temporarily deleted. Thus when the TE flag reset in later restoration, the reading between the previously divided cells is performed discontinuously because of the reset process. Basically, if a restoration method having a process for resetting the TE flag is used, the restored program will have two or more cells. This means that the original program of FIG. 1 is not restored fully because the operation between cells is not defined, though the temporarily deleted part is restored after the temporary deletion. Therefore, since, from the standpoint of a user, a restoration after temporary deletion means restoration to the original state, a method for fully restoring a stream object divided due to temporary deletion is required.

SUMMARY OF THE INVENTION

To solve the above problems, it is an object of the present invention to provide a method for storing search information for restoration of the original state when temporary deletion is performed in a packet-structured stream object.

It is another object to provide a method for storing search information for quickly performing permanent deletion of a temporarily deleted stream object in a packet-structured stream object.

It is another object to provide a method for fully restoring stream objects which are split into a plurality of fragments during temporary deletion.

It is another object to provide a method for updating mapping list (MAPL) information for each stream object unit in a normal stream object, corresponding to the boundary portion when each stream object corresponding to temporal deletion is permanently deleted.

It is another object to provide a recording medium which stores additional information for full restoration of a stream object that is split into a plurality of fragments during temporary deletion of a packet-structured stream object.

It is another object to provide a recording medium which stores search information for quickly performing permanent deletion of a temporarily deleted stream object in a packet-structured stream object.

To accomplish the above objects of the present invention, there is provided a method for deleting part of a stream object stored in a recording medium storing search information for searching a plurality of stream objects, the stream objects having information on the arrival time of packet data and link information for linking search information to actual stream object, the method having a step of updating only search information for a plurality of stream objects generated corresponding to the ranges to be temporarily deleted; and storing first additional information for indicating temporary deletion in a stream object corresponding to a temporary deletion range and second additional information for indicating the presence of a range that can be permanently deleted, when permanent deletion is performed in a stream object having the first additional information.

To accomplish another object of the present invention, there is also provided a method for restoring stream objects fragmented by editing in a recording medium storing search information for searching a plurality of stream objects having information on the arrival time of packet data, and link information for linking the search information to the actual stream objects, the method having a step of updating only search information in order to restore a plurality of stream objects generated corresponding to editing ranges, to the original stream object; and nullifying first additional information for indicating that the corresponding stream object is edited, and second additional information for indicating a range that can be permanently deleted during permanent deletion in stream objects having first additional information, both additional information stored in search information.

To accomplish another object of the present invention, there is also provided a method for permanently deleting part of some stream objects in a recording medium storing search information for searching a plurality of stream objects having information on the arrival time of packet data, and link information for linking search information to the actual stream objects, the method having the steps of updating the search information for a stream object corresponding to a permanent deletion range in each stream object divided by temporary deletion; and updating the link information and updating each mapping list information for stream object units corresponding to the boundary of normal stream objects which are not permanently deleted.

To accomplish another object of the present invention, there is also provided a recording medium in which search information is stored for searching a plurality of stream objects having information on the arrival time of packet data; link information for linking the search information to the actual stream objects; and additional information indicating a range that can be permanently deleted in the plurality of stream objects, as the search information.

Preferably, the additional information includes first additional information for indicating that the stream object corresponding to the temporary deletion range is temporarily deleted, and second additional information for indicating the presence of a range that can be permanently deleted in performing permanent deletion in a stream object having the first additional information. Also, preferably, the additional information further includes third additional information for indicating a range that can be permanently deleted when the second additional information is effective.

Additional objects and advantages of the invention will be set forth in part in the description which follows and, in part, will be obvious from the description, or may be learned by practice of the invention.

BRIEF DESCRIPTION OF THE DRAWINGS

The above objectives and advantages of the present invention will become more apparent by describing in detail preferred embodiments thereof with reference to the attached drawings in which:

FIG. 7 illustrates a table showing search information of each cell divided by temporary deletion/permanent deletion according to the present invention;

FIG. 12 illustrates a table showing search information related to a stream object before and after temporary deletion and after full restoration;

FIG. 13 illustrates a flowchart showing a method for modifying the IAPAT related to the last data stream unit of the preceding stream object when a stream object is divided by permanent deletion according to the present invention; and FIG. 14 illustrates a flowchart showing a method for modifying the IAPAT related to the first data stream unit of the following stream object when a stream object is divided by permanent deletion according to the present invention.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

Figure 1:
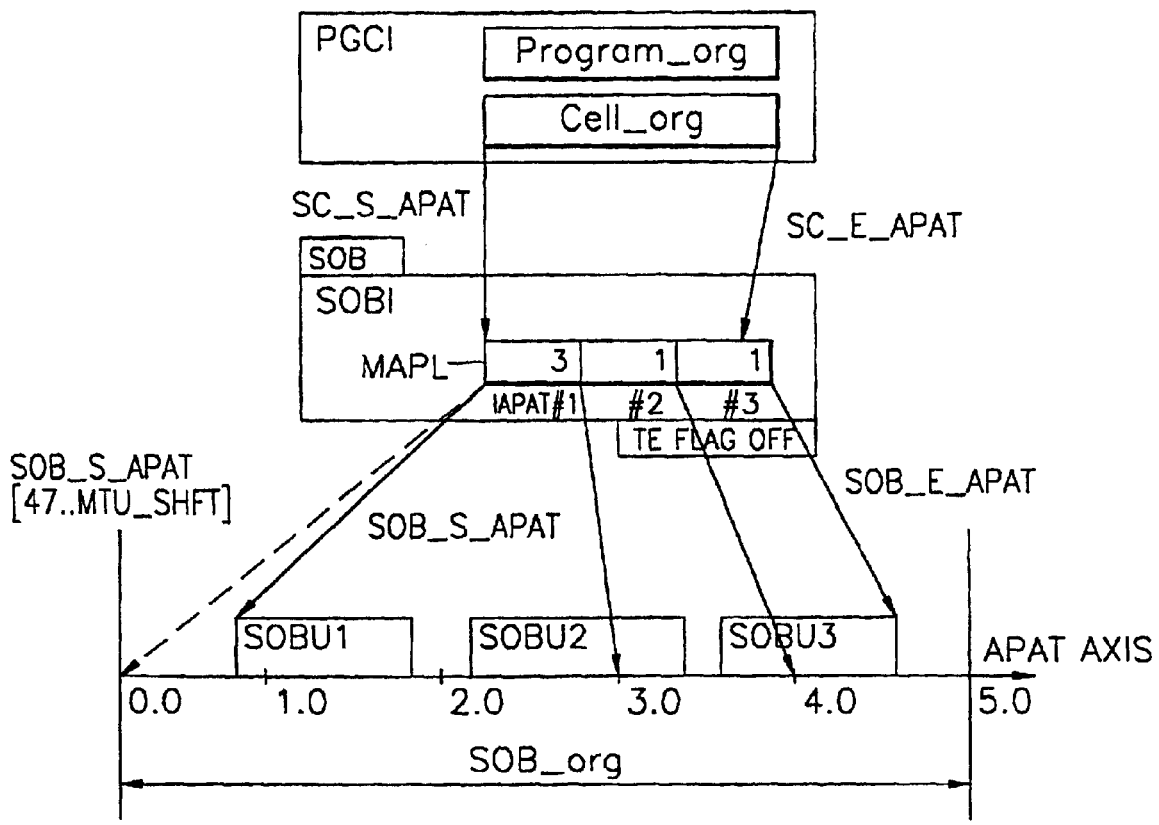
FIG. 1 illustrates an example of the general relationship between data and search information used in reading data in a desired part.
Figure 2:
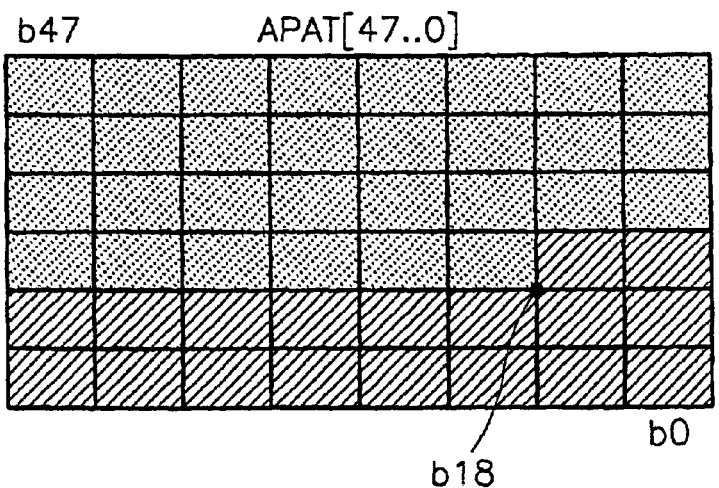
FIG. 2 illustrates an area used to represent application packet arrival time (APAT) and/or incremental application packet arrival time (IAPAT) in the search information shown in FIG. 1.
Figure 3:
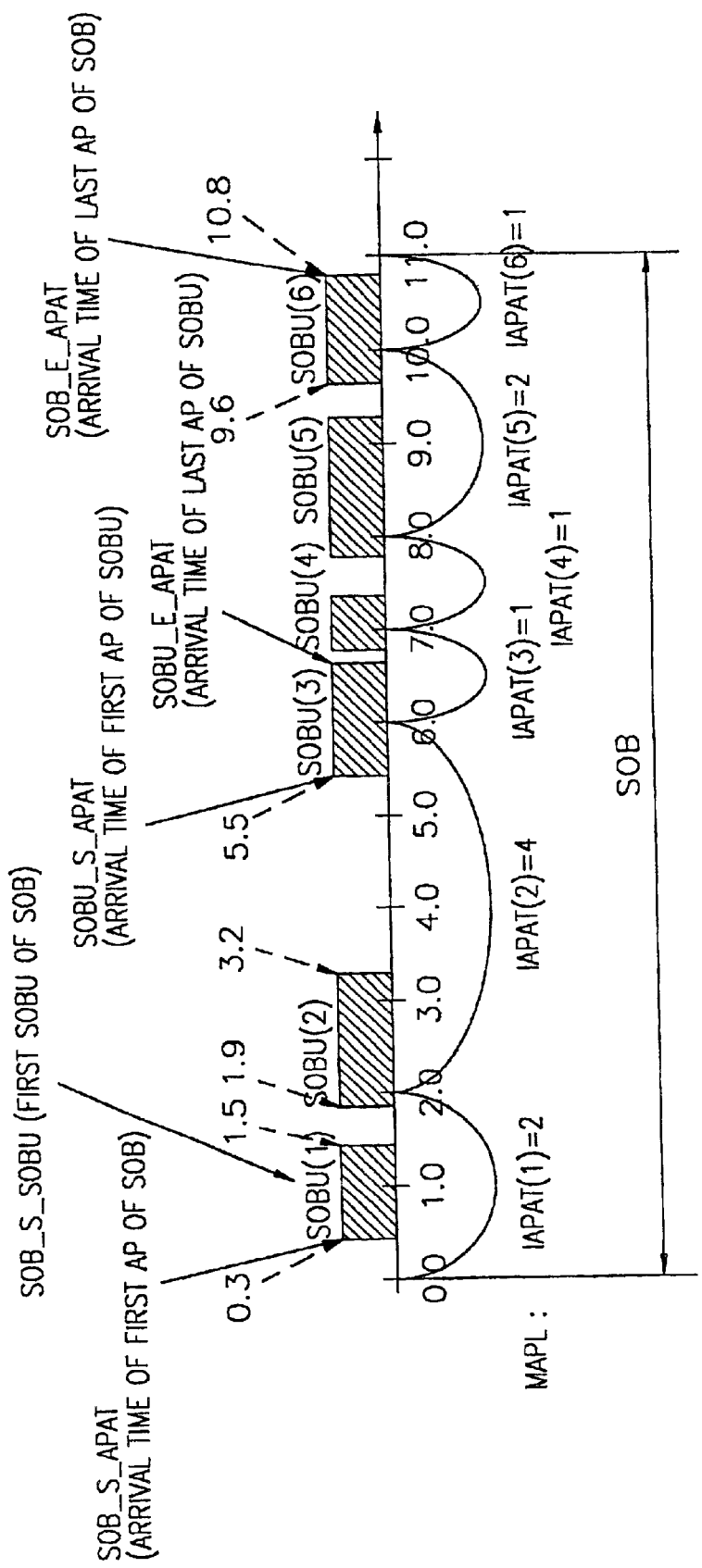
FIG. 3 illustrates a general process for obtaining IAPAT.
Figure 4A:
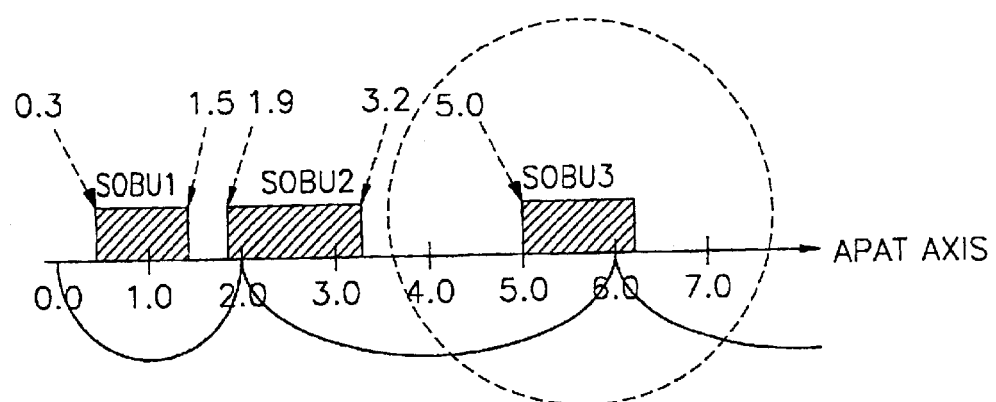
FIGS. 4A and 4B are examples of obtaining IAPAT on boundary areas.
Figure 4B:
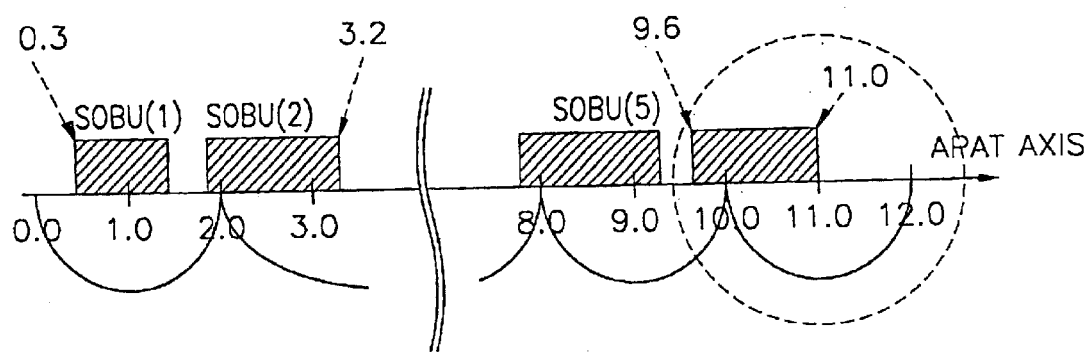
Figure 5:
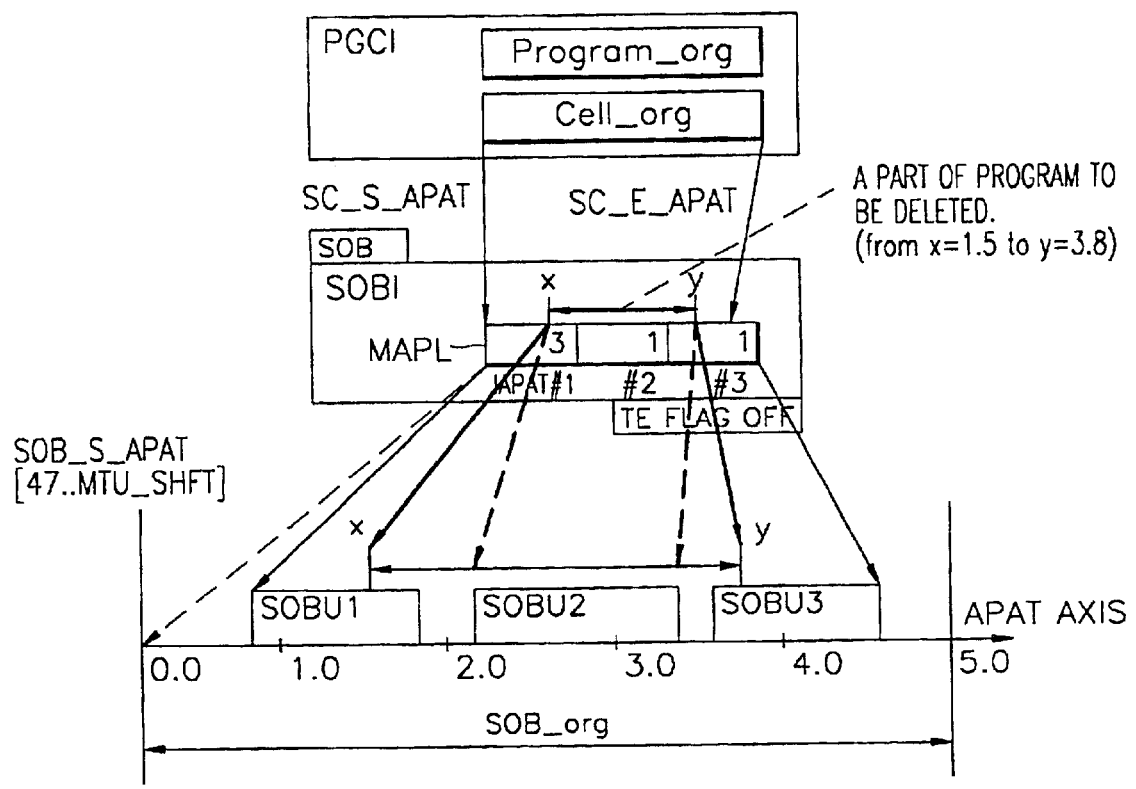
FIG. 5 illustrates an example of a process for determining an area to be deleted for temporarily deleting part of data.

FIG. 5 illustrates an example of a process for determining a range to be deleted for temporarily deleting part of a stream object. From a user's standpoint, it is desirable that a stored program can be accessed randomly and handled in minimum sized units. That is, when the user wants to temporarily delete part of a program that is a film, the user would want to edit the film by scene. Thus, since the degree of precision with is which the user wants to delete is smaller than a stream object unit (SOBU), which is a unit for an editing device to process data, the determination of a range to be deleted needs to be more carefully handled.

FIG. 5 illustrates a user's partial deletion from 1.5 to 3.8 with a degree of accuracy of 0.1, which is a unit that is smaller than the size of an SOBU. Using search information, the user finds time units predetermined for temporary deletion, and based on this, one cell is divided into three cells. While FIG. 5 shows that a user temporarily deletes a time block which spans from x to y, the middle point of the program, deletion of both the first part and/or the last part of the program can be included.

Figure 6:
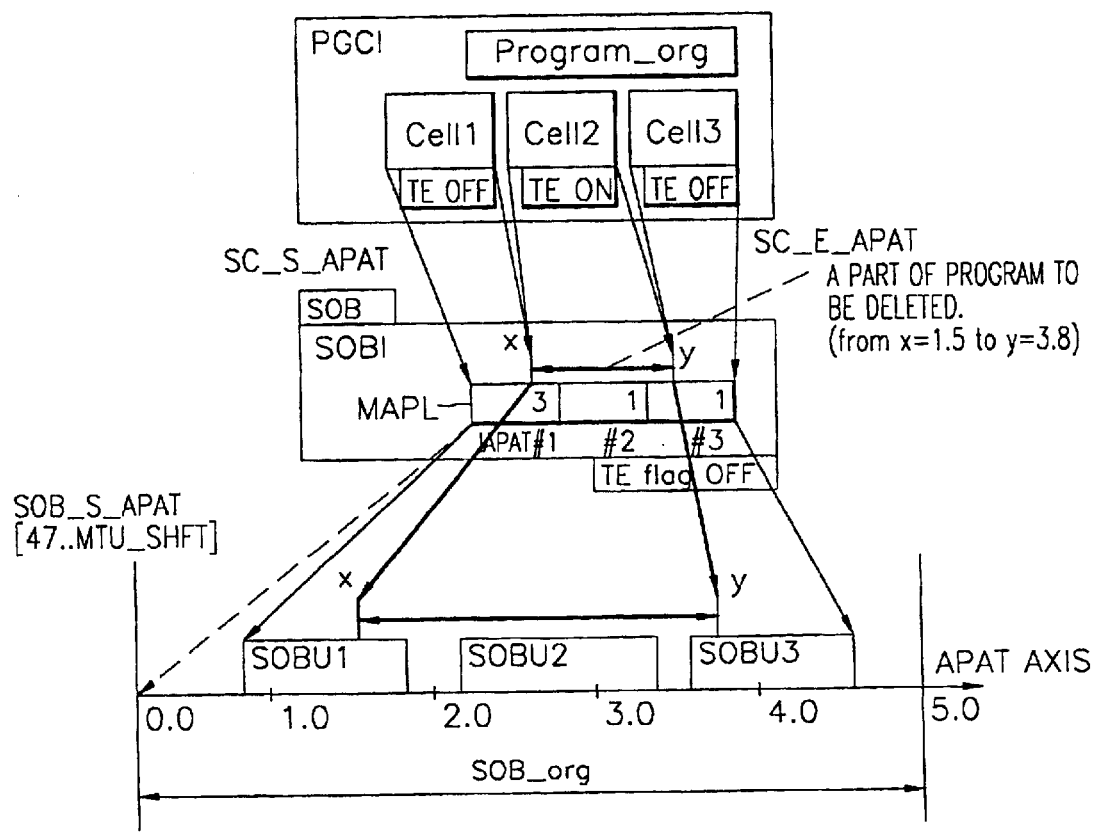
FIG. 6 illustrates an example of a stream object divided by temporary deletion.

FIG. 6 illustrates an example of a stream object divided by temporary deletion, and a block to be deleted spans from x to y, which is represented by Cell 2. After the information of one cell is divided into three cells in order to temporarily delete part of a stream object, a temporary erase (TE) flag in the middle cell among the three cells is set for later restoration. The reason for setting the TE flag is for enabling the user to restore later the part in which such a job (temporary deletion) is performed. The first cell includes the area from the first part of the original cell to the part immediately before the deleted part, and the last cell includes the area from the part immediately after the deleted part to the last part of the original cell. Since stream object information which links search information of a cell to data is not divided, stream object information does not change. Here, Cell 1 spans from 0.8 immediately to x, where x=1.5; Cell 2 represents a block spanning from the arrival time of the AP immediately after x to the arrival time of the AP immediately before y; Cell 3 spans from y, where y=3.8, to 4.8; and the SOB spans from 0.8 to 4.8 before division.

Since a structure is used in which a range indicated by cell information does not match a range indicated by stream object information, and only search information which corresponds to cell information (the upper-level information) changes, the size of a cell can be determined as desired because it does not depend on stream object units, which are lower-level information units.

Therefore, FIG. 6 illustrates search information of a program divided into three cells through a temporary deletion process from x to y. Cell 2 represents an information structure referred to as a cell by binding the part to be temporarily deleted, and the TE flag of Cell 2 is set in order to indicate the temporarily deleted part. When such search information is included, and a reproducing device reproduces Cell 1 and Cell 3 contiguously, generally, a reset process is performed on the boundary between Cell 1 and Cell 3. Since Cell 2 is temporarily deleted, Cell 2 is not reproduced.

In the process of temporarily deleting the time block spanning from x to y, a cell is divided into three cells. Search information for each divided cell is shown in the table of FIG. 7.

The application packets (AP) in the table of FIG. 7 are data used in packet-structured applications. In the table, SOB related information represents incremental AP arrival time (IAPAT), the arrival time of the first AP of an SOB (SOB_S_APAT), the arrival time of the last AP of an SOB (SOB_E_APAT), etc., shown in FIG. 5; stream cell type (SC_TY) includes the type of a cell, a TE flag, a permanent erase (PE) flag, etc.; start SOBU of the entry point for erasing (EP_S_SOBU) represents the first stream object unit among stream object units which are included in a temporarily deleted cell and can be permanently deleted; end SOBU of the entry point for erasing (EP_E_SOBU) represents the last stream object unit among stream object units which are included in a temporarily deleted cell and can be permanently deleted; the arrival time of the first AP of a cell (SC_S_APAT) represents the arrival time of the first data located in the first part of a cell; and the arrival time of the last AP of a cell (SC_E_APAT) represents the arrival time of the last data located in the last part of a cell.

In temporary deletion, a process for generating search information will now be explained.

As an initial matter, the SOBUs are referenced starting from the number 1. A value ix means the number of an SOBU which includes x. That is, SOBU (ix) refers to the SOBU which includes x. However, when x is the same as the arrival time of the first AP of an SOBU, ix is the number of an SOBU immediately before the SOBU which includes x. The value iy means the number of an SOBU which includes y. That is, SOBU(iy) refers to the SOBU which includes y. However, when y is the same as the arrival time of the last AP of an SOBU, iy is the number of an SOBU immediately after the SOBU which includes y. Therefore, in FIG. 6, SOBU(ix) is SOBU(1), and SOBU(iy) is SOBU(3). For reference, SOBU(ix+1) is SOBU(2), and SOBU(iy−1) is SOBU(2).

Step 1: The arrival time of the first AP of Cell_org is copied and then used as the arrival time of the first AP of Cell 1.

Step 2: The arrival time of the first AP after x becomes the arrival time of the first AP of Cell 2.

Step 3: The minimum one among the arrival times of AP greater than or equal to y becomes the arrival time of the first AP of Cell 3.

Step 4: The maximum one among the arrival times of AP less than or equal to x becomes the arrival time of the last AP of Cell 1.

Step 5: The arrival time of the last AP before y becomes the arrival time of last AP of Cell 2.

Step 6: The arrival time of the last AP of Cell_org is copied and then used as the arrival time of the last AP of Cell 3.

Step 7: The TE flag of Cell 2, which is to be temporarily deleted, is set. Since Cell 2 includes SOBU(2), the SOBU which can be permanently deleted, the PE flag is also set. If a cell does not include an SOBU which can be permanently deleted, the PE flag of the cell is not set.

Step 8: In the cell whose PE flag is set, EP_S_SOBU, the first SOBU which can be permanently deleted is recorded as SOBU(ix+1).

Step 9: In the cell whose PE flag is set, EP_E_SOBU, the last SOBU which can be permanently deleted is recorded as SOBU(iy−1).

Figure 8:
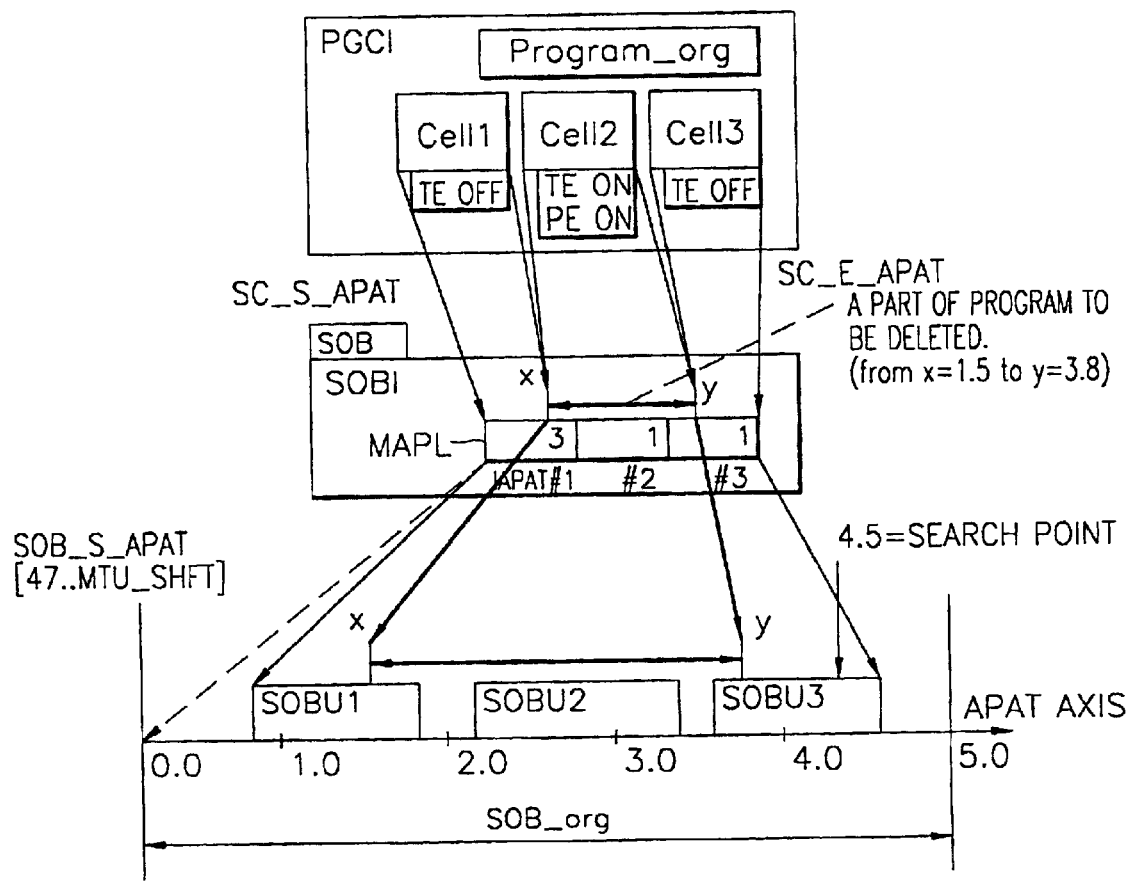
FIG. 8 illustrates an example of a stream object divided by temporary deletion/permanent deletion according to the present invention.

Examples of the steps 1 through 9 are shown in FIG. 8.

After dividing a stream object, a process for searching stream objects using modified search information will now be explained. Referring to Cell 3 shown in FIG. 8, the process will be explained in an expression which can include general cases.

As shown in FIG. 8, a user who wants to find data, that is, an application packet, on 4.5, can find the data through following steps:

Step 1: 4.5 is stored in a variable target.

Step 2: The integer part of the arrival time of the first AP of an SOB (SOB_S_APAT) becomes the initial value for accumulation.

Step 3: 1 is stored as the starting value for variable i.

Step 4: The accumulation of IAPAT(i) is performed $$\left(sum = \sum_{j=1}^{i} IAPAT(j)\right).$$

Step 5: When the variable target is less than or equal to the result of the accumulation (sum), the 'target' is included in SOBU(i). When the variable target is greater than the result of the accumulation (sum), i is incremented by 1, and step 4 is performed again.

In a preferred embodiment, in the process of finding a stream object unit which includes desired data, setting the integer part of the arrival time of the first packet of a stream object as the initial value of accumulation of the IAPAT of an SOBU, instead of setting the initial value to "0", enables IAPAT to be kept at a smaller value, which is the merit of this method.

Figure 9:
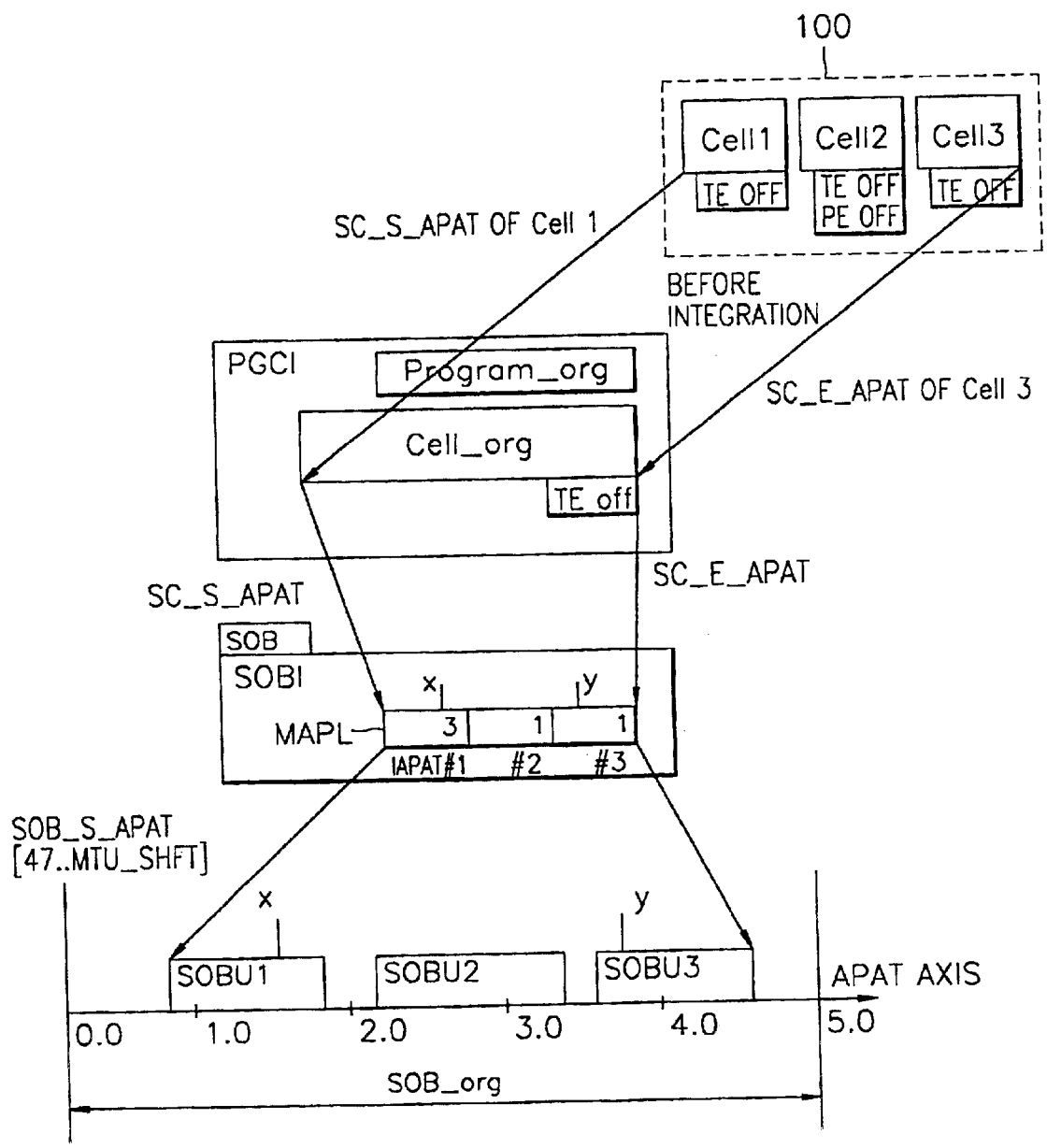
FIG. 9 illustrates an example of restoring a stream object divided by temporary deletion according to the present invention.

The block 100 marked by dotted lines in FIG. 9 shows an example of restoration in which stream objects divided by temporary deletion is restored using a simple restoration method. The simple restoration nullifies a TE flag in a stream object which cannot be seen by a user due to setting the TE flag. That is, the TE flag in the stream object information is reset in order to indicate that the cell is temporarily deleted. When this method is used, the user can read Cell 1, Cell 2, and Cell 3.

However, since a program which was formed by a cell is divided into three cells by partial deletion, definition of operations among cells are required when cells are restored. In order to solve the problem that reading among the cells is performed discontinuously because of a reset process inserted in the previous method, the present invention provides a method for fully restoring a cell structure shown in FIG. 9.

For full restoration shown in FIG. 9, first, it should be recalled that Cell 1, Cell 2, and Cell 3 were previously one cell. As such, SOB related to each cell is considered. That is, when a plurality of cells related to the same SOB exist, it means that those cells are divided by temporary deletion. When cells which can be fully restored are found, the starting time and the ending time of an integrated cell are set using the starting time of the first cell and the ending time of the last cell, respectively. Other cell information is deleted.

Figure 10:
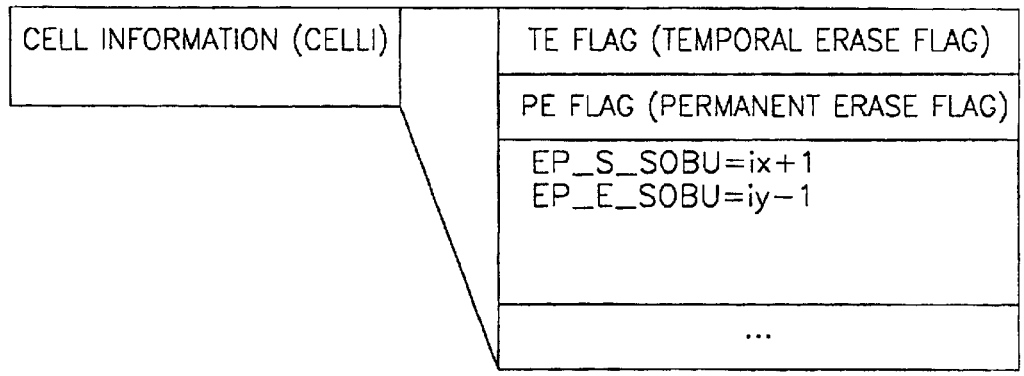
FIG. 10 illustrates an example of stream cell information (SCI) structure according to the present invention.

FIG. 10 illustrates an example of additional information, according to the present invention, implemented in an area of stream cell information (SCI), which is search information. Here, the TE flag indicates that a cell including SCI is temporarily deleted; the PE flag indicates that the cell temporarily deleted includes stream object units which can be permanently deleted; EP_S_SOBU represents the first stream object unit among the stream object units which can be permanently deleted; and EP_E_SOBU represents the last stream object unit among the stream object units which can be permanently deleted. In representing stream object units which can be permanently deleted, any information that can indicate stream object unit properly and clearly, such as the number of a stream object unit, and the arrival time of the first AP of a stream object unit, can be used. When the PE flag is not set, EP_S_SOBU and EP_E_SOBU are not stored in cell information.

Figure 11:
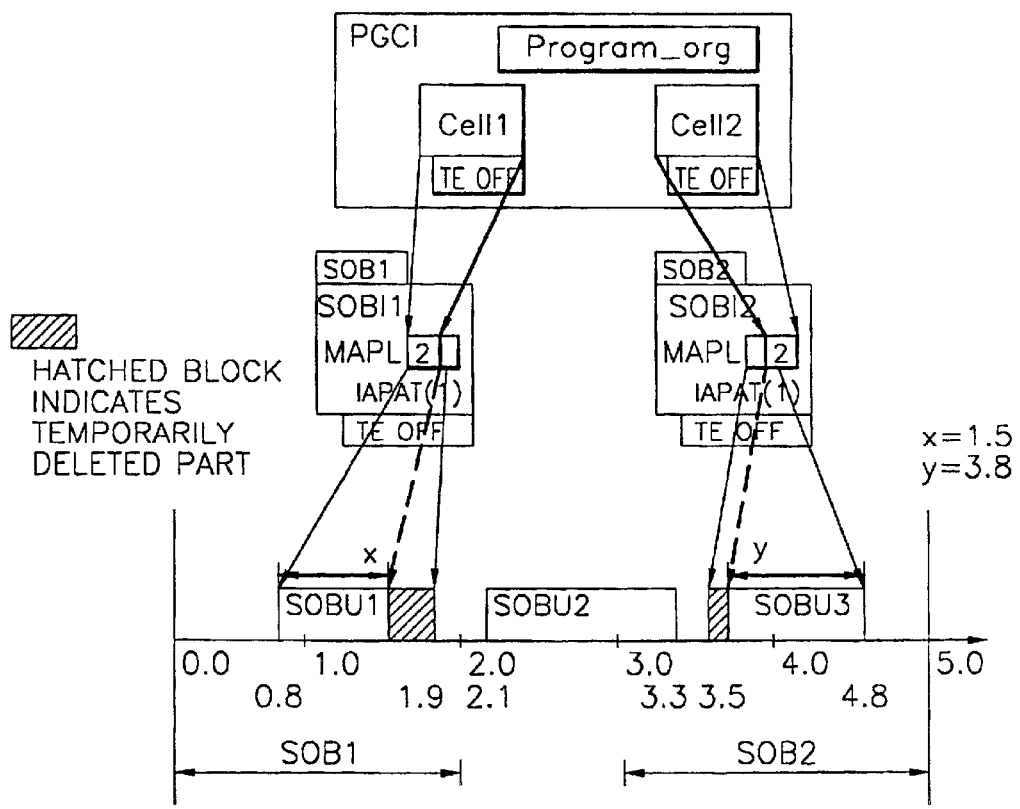
FIG. 11 illustrates an example of permanently deleting part of a program using SCI information shown in FIG. 10.

FIG. 11 illustrates an example of permanently deleting part of a program using cell information shown in FIG. 10, and FIG. 12 is a table showing changed information before and after permanent deletion.

When Cell 2 in FIG. 8 is permanently deleted, the SOBU which can be permanently deleted is SOBU(2), referring to EP_S_SOBU and EP_E_SOBU information in FIG. 12. When permanent deletion is performed, link information as well as search information should be changed. Therefore, when Cell 2 is permanently deleted, IAPAT information of SOBU(1) should be changed because SOBU(1), the last SOBU of Cell 1, is the last SOBU of a stream object which is newly generated by division. IAPAT information of SOBU(3) must be changed because SOBU(3), the first SOBU of Cell 3, is the first SOBU of a stream object which is newly generated by division. In addition, search information of Cell 2 must be deleted, and link information related to SOBUs which are included in Cell 2 and can be permanently deleted, must be deleted too. For reference, when part of an SOBU is deleted, link information is not deleted in search information.

When search information and link information of Cell 2 are fully deleted, search information and link information of Cell 3 are updated as search information and link information of Cell 2.

FIG. 13 illustrates a flowchart showing a method for modifying the IAPAT related to the last SOBU of the preceding SOB (corresponding to Cell 1 of FIG. 11) when a stream object is divided by permanent deletion according to the present invention. On the boundary between SOB1 and SOB2 after division of a stream object by permanent deletion, the IAPAT related to SOBU(ix=1), the last SOBU of SOB1, must be modified because the relative location of SOBU(ix) inside the stream object changes. It is assumed that the arrival time of the last AP of SOBU(ix), the arrival time of the first AP of SOBU(ix+1), the arrival time of the last AP of SOBU(iy−1), and the arrival time of the first AP of SOBU(iy) are already known.

First, the arrival time of the first AP of SOBU(ix+1=2), the first SOBU of the SOB2, is rounded up to an integer value, and stored in a variable named preEnd_high, which is 3 in the example given; the integer part of the arrival time of the last AP of SOBU(ix=1), the last SOBU of SOB1, is stored in a variable named preEnd_APAT high, which is 1 in the example given; and the IAPAT of SOBU(ix), the last SOBU of SOB1, is stored in a variable named preEnd_IAPAT(3) in step S101. The difference, delta=2, between preEnd high and preEnd_APAT high is obtained; the difference (delta=2) is subtracted from preEnd_IAPAT; and preEnd_IAPAT is modified by increasing it by a unit value (here, it is 1) in step S102. The modified preEnd_IAPAT(2) is stored as the IAPAT of SOBU(ix) in step S103. Therefore, the IAPAT of SOBU(ix=1) is 2.

FIG. 14 illustrates a flowchart showing a method for modifying the IAPAT related to the first SOBU of the following SOB (corresponding to Cell 2 of FIG. 11) when a stream object is divided by permanent deletion according to the present invention. Since the relative location of the IAPAT related to SOBU(iy=3), the first SOBU of SOB 2, changes inside the stream object, the value must be modified.

First, the arrival time of the first AP of SOBU(iy=3), the first SOBU of SOB2, is stored in a variable named sucStart_APAT, which is 3.5 in the example given, and the IAPAT of SOBU(iy), the first SOBU of SOB2, is stored in a variable named sucStart_IAPAT, which is 1 in the example given, in step S111. It is determined whether or not sucStart_APAT is an integer, and if sucStart_APAT is not an integer, sucStart_IAPAT is modified by increasing it by a unit value (here, the unit value is 1) in step S113. The modified sucStart_IAPAT which is 2 in the example given, is stored as the IAPAT of SOBU(iy), or if sucStart_APAT is an integer in S112, sucStart_IAPAT, which is set in the step S111, is stored as the IAPAT of SOBU(iy) without change in step S114. Therefore, the IAPAT of SOBU(iy=3) is 2.

According to the present invention, a method for generating search information, which has not been suggested in the previous art, is provided. When the information structure and restoration method provided by the present invention are used, stream objects divided by temporary deletion can be fully restored to their original state.

In addition, in permanently deleting a part temporarily deleted, the range to be deleted can be found only using search information and it is appropriate for such applications that need fast deletion.

What is claimed is:

1. A method for deleting part of a stream object stored in a recording medium storing search information for searching a plurality of the stream objects, the stream objects having information on the arrival time of packet data and link information for linking search information to stream object data, the method comprising:
   updating only search information for the plurality of stream objects generated corresponding to temporary deletion ranges; and
   storing first additional information for indicating temporary deletion in at least a part of the stream object corresponding to a temporary deletion range, and second additional information for indicating the presence of a permanent deletion range when permanent deletion is performed in the at least part of the stream object having the first additional information.

2. The method of claim 1, wherein the storing step further comprises storing in the search information third additional information indicating an area which can be permanently deleted, when the second additional information is effective.

3. The method of claim 1, wherein the search information is managed in units of a cell;
   the updating step comprises
      updating an arrival time of a first packet data and a last packet data of each cell divided by temporary deletion,
      effectuating the first additional information corresponding to the temporary deletion range, and
      effectuating the second additional information when the temporary deletion range includes the permanent deletion range; and
   the storing step comprises recording information on a first location and a last location of the permanent deletion range in a cell having the effectuated second additional information.

4. The method of claim 3, wherein the first location information and the last location information indicate a first stream object unit and a last stream object unit, respectively, of consecutive stream object units that can be permanently deleted.

5. A method for restoring stream objects fragmented by editing in a recording medium storing search information for searching the plurality of stream objects having information on an arrival time of packet data, and link information for linking the search information to stream object data, the method comprising:
   updating only search information in order to restore the plurality of stream objects generated corresponding to editing ranges, to the original stream object; and
   nullifying first additional information for indicating that the corresponding stream object is edited, and second additional information for indicating a permanent deletion range that can be permanently deleted during permanent deletion in stream objects having first additional information, both additional information being stored in the search information.

6. The method of claim 5, wherein the editing is by temporal deletion, and the nullifying step further includes nullifying third information which indicates the permanent deletion range when the second additional information is effective.

7. The method of claim 5, wherein the updating step comprises
   updating an arrival time of a first packet data and a last packet data in a cell corresponding to each stream object to be restored, with the arrival time of a first packet data and a last packet data, respectively, of a stream object preceding to each stream object fragmented by temporary deletion; and
   nullifying the first additional information for indicating that the corresponding stream object is edited, and the second additional information for indicating the permanent deletion range in stream objects having the first additional information, both additional information being stored in the search information.

8. A method for permanently deleting at least part of one of a plurality of stream objects in a recording medium storing search information for searching the plurality of stream objects having information on the arrival time of packet data, and link information for linking search information to stream object data, the method comprising:
   updating the search information for the at least part of the stream object corresponding to a permanent deletion range in each stream object divided by temporary deletion; and
   updating the link information and each mapping list information for stream object units corresponding to a boundary of stream objects which are not permanently deleted.

9. The method of claim 8, wherein the search updating step comprises deleting cell information corresponding to the permanent deletion range.

10. The method of claim 8, wherein the link updating step further comprises
   deleting link information related to each stream object unit which can be permanently deleted,
   updating an incremental application packet arrival time (IAPAT) related to a last stream object unit of a preceding stream object on a boundary between a stream object corresponding to the permanent deletion range and the preceding stream object, and
   updating an IAPAT related to a first stream object unit of a following stream object on a boundary between the stream object corresponding to the permanent deletion range and the following stream object.

11. The method of claim 10, wherein the last IAPAT updating step comprises
   obtaining a first value in the form of integer by rounding up an arrival time of a first packet data of the first stream object unit of the stream object corresponding to the permanent deletion range, and a second value by taking the integer part of an arrival time of a last packet data of the last stream object unit of the preceding stream object,
   providing a first subtraction result by subtracting the second value from the first value, and a second subtraction result by subtracting the first subtraction result from an IAPAT of the last stream object unit of the preceding stream object, and obtaining the IAPAT related to the last stream object unit of the preceding stream object by incrementing the second subtraction result by a unit value.

12. The method of claim 10, wherein the first IAPAT updating step comprises determining whether or not an arrival time of a first packet data of a first stream object unit of the following stream object is an integer; and modifying an IAPAT of the first stream object unit by incrementing it by a unit value when the arrival time of the first packet data of the first stream object unit of the following stream object is not an integer, and otherwise, providing the IAPAT of the first stream object unit of the following stream object without change.

13. A recording medium on which search information is stored for used by an apparatus for searching a plurality of stream objects comprising:

information on the arrival time of packet data;

link information used by the apparatus for linking the search information to at least one of the stream objects; and additional information indicating to the apparatus a permanent deletion range in the plurality of stream objects, as the search information.

14. The recording medium of claim 13, wherein the additional information includes first additional information for indicating that a stream object corresponding to a temporary deletion range is temporarily deleted, and second additional information for indicating the presence of a permanent deletion range in performing permanent deletion in a stream object having the first additional information.

15. The recording medium of claim 14, wherein the additional information further includes third additional information for indicating the permanent deletion range when the second additional information is effective.

16. A method for updating part of an original stream object in a recording medium storing search information for searching a plurality of stream objects, comprising:

editing the original stream object to create at least one edited stream object; and updating the search information corresponding to the edited stream object to indicate the edit.

17. The method of claim 16, wherein the editing step comprises creating a temporary deletion range wherein the edited stream object is the original stream object divided into divided stream objects, the updating step comprises storing search information for the divided stream objects.

18. The method of claim 17, wherein the updating step further comprises restoring the original stream object using the stored search information for each of the divided stream objects wherein the divided stream objects are merged.

19. A method for updating part of an original stream object in a recording medium storing search information for searching a plurality of stream objects, comprising:

editing the original stream object to create at least one edited stream object; and updating the search information corresponding to the edited stream object, wherein:

the editing step comprises creating a temporary deletion range wherein the edited stream object is the original stream object divided into divided stream objects, the updating step further comprises storing search information for the divided stream objects, and permanently dividing the stream objects according to the temporary deletion range to create new stream objects using the stored search information for each divided stream object.

20. The method of claim 19, wherein the updating step further comprises updating link information and associated with the new stream objects, and deleting stream object units entirely within the temporary deletion range.

21. An apparatus that updates part of an original stream object in a recording medium storing search information for searching a plurality of stream objects using the method of claim 16.

22. An apparatus that updates part of an original stream object in a recording medium storing search information for searching a plurality of stream objects using the method of claim 19.

23. The method of claim 1, wherein, prior to being stored on the storage medium, the stored stream objects were transmitted as the stream objects and were received at an apparatus which stored the transmitted stream objects on the storage medium.

24. The method of claim 3, wherein the arrival time of the packet data comprises a time at which the packet data included in transmitted stream objects was received at the apparatus after transmission.

25. The method of claim 5, wherein the arrival time of the packet data comprises a time at which the packet data included in transmitted stream objects was received at an apparatus which stored the stream objects on the recording medium after transmission.

26. The method of claim 8, wherein the permanent deletion is provided by the updated search information and updated link information without physically deleting the part of the stream object corresponding to the permanent deletion range to be deleted from the recording medium.

27. The recording medium of claim 13, wherein the additional information corresponds to the range which the apparatus interprets as being permanently deleted, and the plurality of stream objects in the range are not physically deleted.

28. The recording medium of claim 13, wherein the plurality of stream objects are recorded on the recording medium when received at the apparatus after transmission as the plurality of stream objects.

29. The method of claim 16, wherein, prior to being stored on the recording medium, the stored original stream object was transmitted as the original stream object and was received at an apparatus which stored the transmitted stream object on the recording medium.

* * * * *